United States Patent
Kobayashi

(10) Patent No.: US 9,466,106 B2
(45) Date of Patent: Oct. 11, 2016

(54) MEDICAL IMAGE PROCESSING APPARATUS AND COMPUTER-READABLE STORAGE MEDIUM

(71) Applicant: KONICA MINOLTA, INC., Chiyoda-ku (JP)

(72) Inventor: Tsuyoshi Kobayashi, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/521,201

(22) Filed: Oct. 22, 2014

(65) Prior Publication Data
US 2015/0110380 A1 Apr. 23, 2015

(30) Foreign Application Priority Data
Oct. 22, 2013 (JP) ................................. 2013-219093

(51) Int. Cl.
*G06K 9/00* (2006.01)
*G06T 7/00* (2006.01)

(52) U.S. Cl.
CPC .......... *G06T 7/0014* (2013.01); *G06T 7/0028* (2013.01); *G06T 2207/10004* (2013.01); *G06T 2207/10116* (2013.01); *G06T 2207/20012* (2013.01); *G06T 2207/20192* (2013.01); *G06T 2207/30008* (2013.01); *G06T 2207/30061* (2013.01)

(58) Field of Classification Search
None
See application file for complete search history.

(56) References Cited

U.S. PATENT DOCUMENTS

| | | | | |
|---|---|---|---|---|
| 2001/0046320 A1* | 11/2001 | Nenonen | ................. | G06T 5/004 382/169 |
| 2004/0101188 A1* | 5/2004 | Oosawa | .................. | G06T 7/001 382/132 |
| 2006/0222225 A1* | 10/2006 | Kurahashi | ............. | G06F 19/321 382/128 |
| 2007/0260137 A1* | 11/2007 | Sato | .......................... | G06T 5/50 600/407 |

FOREIGN PATENT DOCUMENTS

JP 2004-056230 2/2004

OTHER PUBLICATIONS

Search Report dated Feb. 27, 2015 which issued in the corresponding European Patent Application No. 14 18 9752.0.
(Continued)

*Primary Examiner* — Hadi Akhavannik
(74) *Attorney, Agent, or Firm* — Cozen O'Connor

(57) ABSTRACT

A medical image processing apparatus and a computer-readable storage medium are shown. The medical image processing apparatus includes an emphasizing processing unit, a positioning unit, and a difference image generating unit. The emphasizing processing unit performs processing to emphasize a specific structure among structures composing a subject on each of a first image and a second image obtained by capturing the same subject at different points in time. The positioning unit matches a position of the specific structure in the first image and the second image based on the first image and the second image with the specific structure emphasized. The difference image generating unit generates a difference image between the first image and the second image with the position of the specific structure matched.

10 Claims, 16 Drawing Sheets

(56) References Cited

OTHER PUBLICATIONS

Zhao et al. "Enhanced Lung Cancer Detection in Temporal Subtraction Chest Radiography Using Directional Edge Filtering Techniques", International Society for Optical Engineering, vol. 4684, Jan. 1, 2002, pp. 1-6.

Zhao et al. "Directional edge registration for temporal chest image subtraction", Applied Imagery Pattern Recognition Workshop, Oct. 2001, 1 page.

* cited by examiner

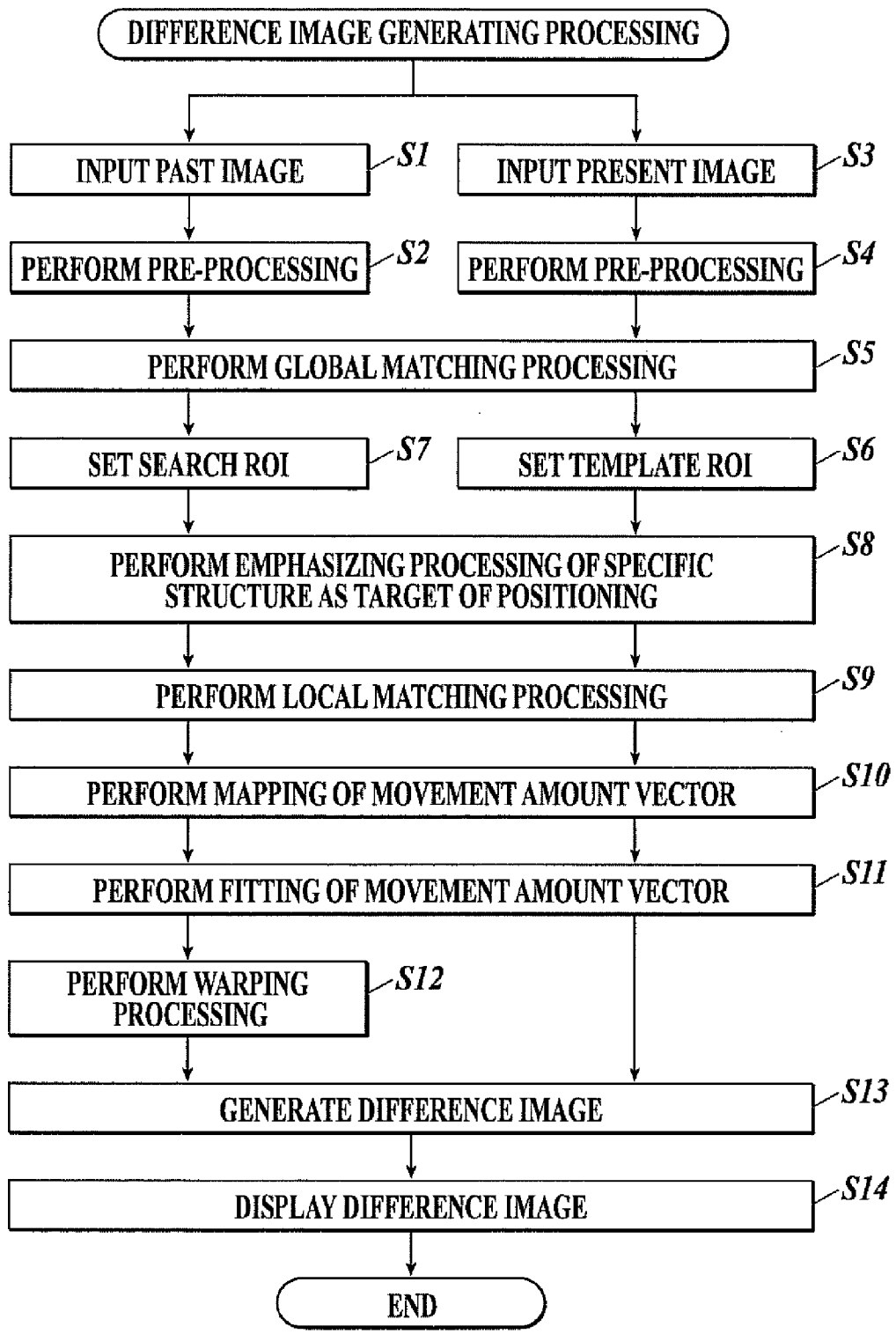

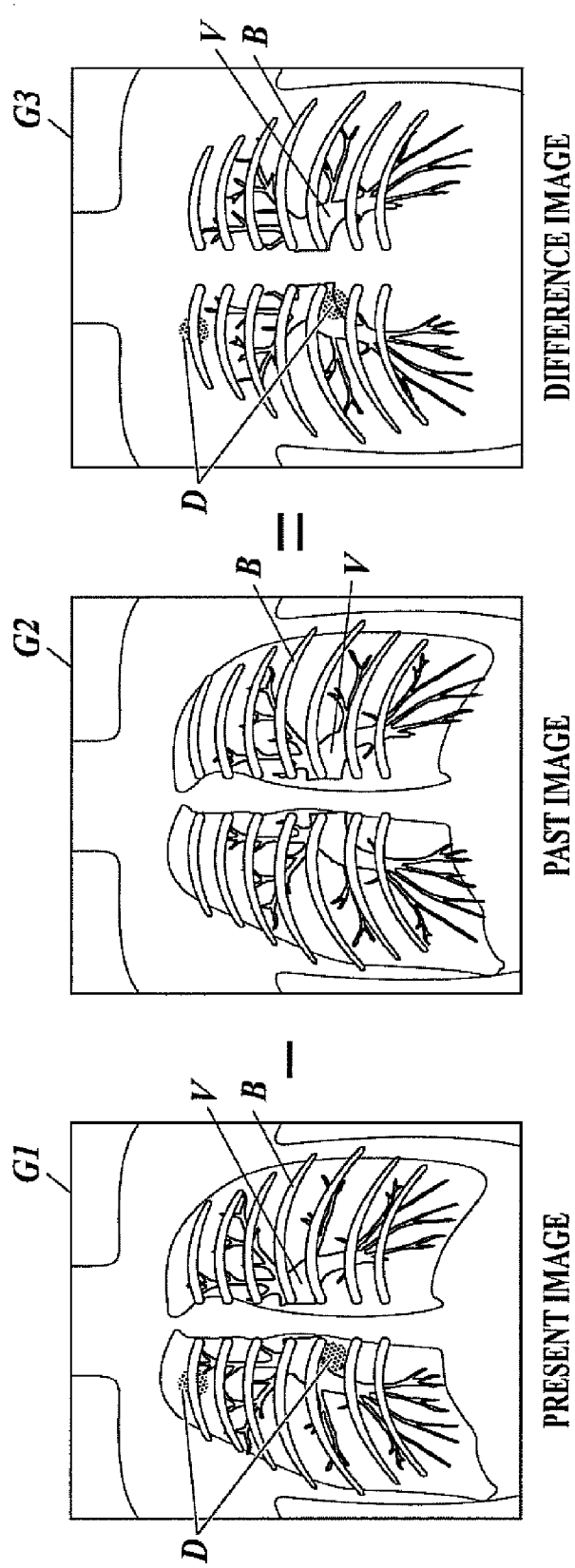

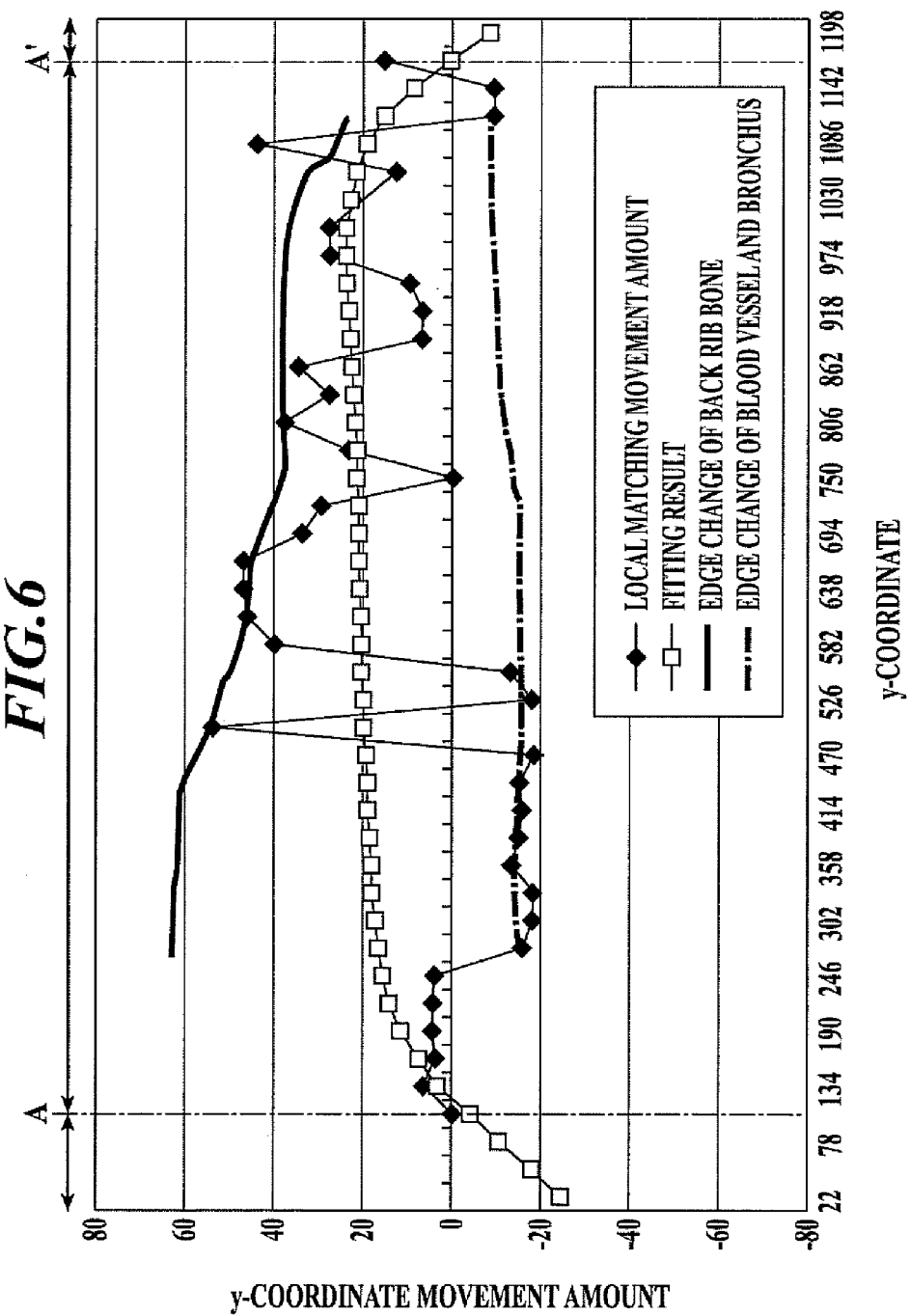

FIG.7

| -2 | -2 | -2 | -2 | -2 |
|----|----|----|----|----|
| -1 | -1 | -1 | -1 | -1 |
| 0  | 0  | 0  | 0  | 0  |
| 1  | 1  | 1  | 1  | 1  |
| 2  | 2  | 2  | 2  | 2  |

FIG.11

| | RANGE OF $\theta$ |
|---|---|
| FILTER A1 | $7 \times \frac{360°}{32°} \leq \theta < 9 \times \frac{360°}{32°}$ |
| FILTER A2 | $5 \times \frac{360°}{32°} \leq \theta < 7 \times \frac{360°}{32°}$ |
| FILTER A3 | $3 \times \frac{360°}{32°} \leq \theta < 5 \times \frac{360°}{32°}$ |
| FILTER A4 | $\frac{360°}{32°} \leq \theta < 3 \times \frac{360°}{32°}$ |
| FILTER A5 | $-\frac{360°}{32°} \leq \theta < \frac{360°}{32°}$ |
| FILTER A6 | $-\frac{360°}{32°} \leq \theta < -3 \times \frac{360°}{32°}$ |
| FILTER A7 | $-3 \frac{360°}{32°} \leq \theta < -5 \times \frac{360°}{32°}$ |
| FILTER A8 | $-5 \frac{360°}{32°} \leq \theta < -7 \times \frac{360°}{32°}$ |
| FILTER A9 | $-7 \frac{360°}{32°} \leq \theta < -9 \times \frac{360°}{32°}$ |

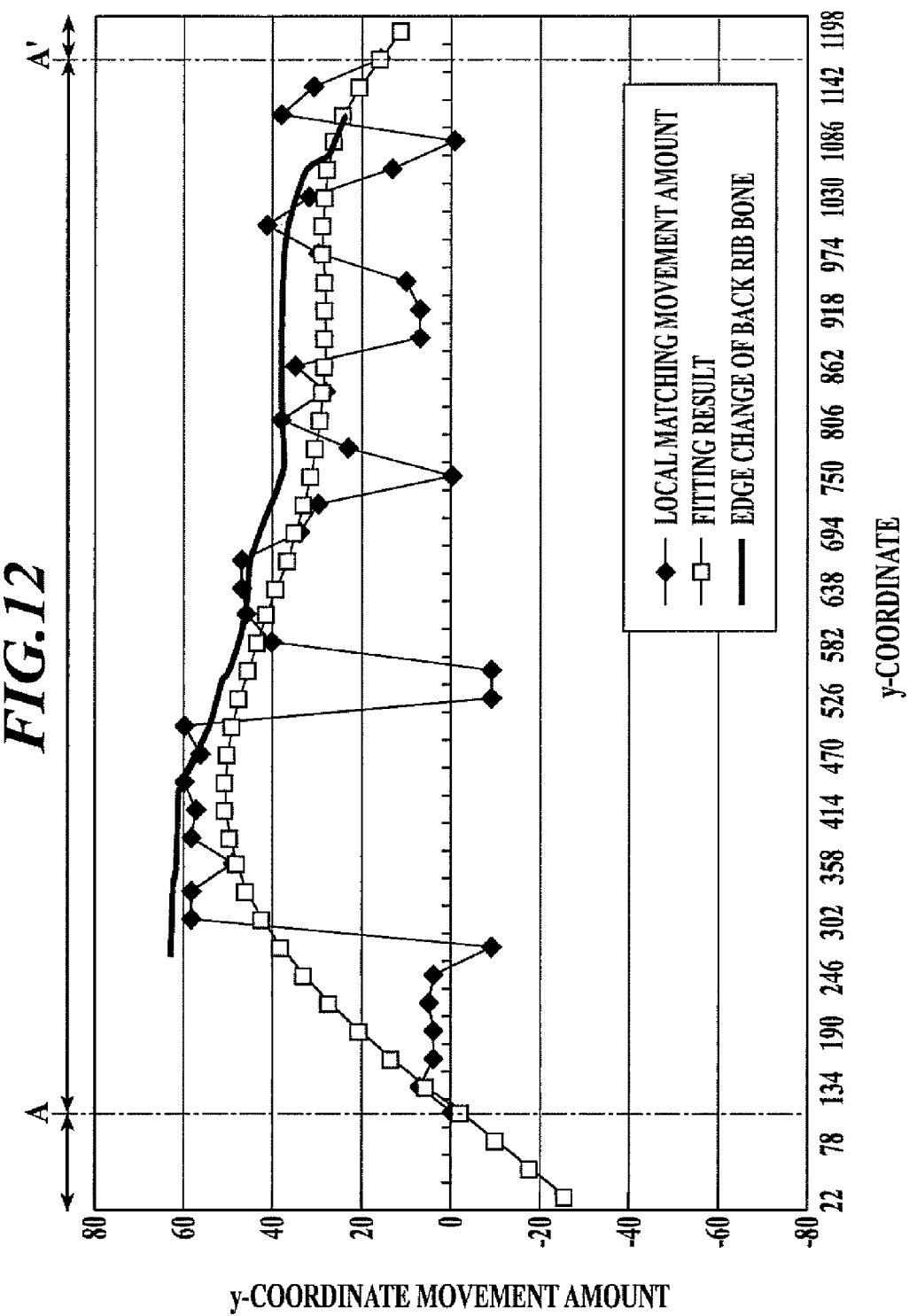

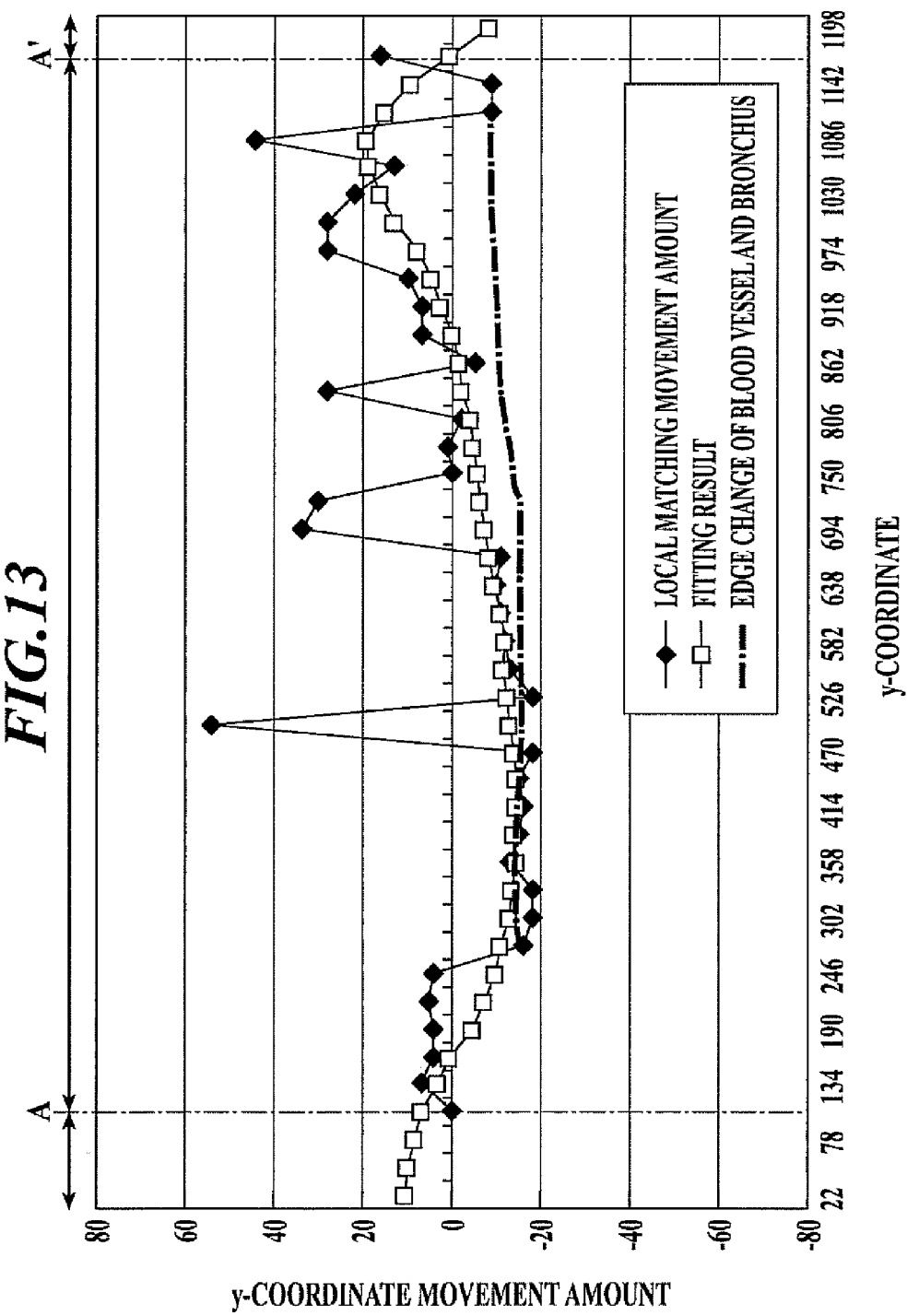

X-RAY SOURCE

X-RAY SOURCE

MEDICAL IMAGE PROCESSING APPARATUS AND COMPUTER-READABLE STORAGE MEDIUM

CROSS-REFERENCE TO RELATED APPLICATION

The present U.S. patent application claims priority under the Paris Convention of Japanese Patent Application No. 2013-219093 filed on Oct. 22, 2013 the entirety of which is incorporated herein by reference.

BACKGROUND

1. Field of the Invention

The present invention relates to a medical image processing apparatus and a computer-readable storage medium.

2. Description of Related Art

In diagnosis of a thoracic portion, a thoracic portion X-ray image captured in the past is compared with the present thoracic portion X-ray image, and this is called comparative interpretation.

In order to assist comparative interpretation, there is a well-known technique where a computer obtains a difference between the image captured in the past and the present image to reduce a normal structure where there is no temporal change (anatomical structure of the human body), and the computer generates a difference image emphasizing portions where there is temporal change such as an abnormal shadow.

However, the thoracic portion X-ray image projects a thoracic portion of the human body with three dimensions in two dimensions. Therefore, compared to FIG. 17A with correct posture, when the subject tilts forward or backward, or rotates around the body axis as shown in FIG. 17B or there is a misalignment in the position of the X-ray source (oblique incidence) as shown in FIG. 18 when the subject is captured, the image is projected in a state where the positions of the bone, blood vessel and other structures in the lung field are misaligned from the state in the correct posture. Especially in small medical institutions such as general practioners, a fixed portion is not captured as in mass examination and the X-ray source is often moved. Moreover, since there is no specialized capturing operator, the positioning may be varied, and a misalignment of the positions of the above structures easily occur. When the positions of the above structures in the lung field are misaligned in the 2 images, the structure which is normal may also be drawn when simply the difference is obtained, and this becomes an artifact.

Conventionally, in order to correct the misalignment of the positions between 2 images which are compared, local matching processing, warping processing, etc. are performed to match the positions of the images and then the difference is obtained. However, in 2 images where the positions of the structure are misaligned, the positions do not match with any structure even if positioning is performed, the normal structure is drawn in the entire difference image, and the image becomes very difficult for the physician to interpret.

For example, Japanese Patent No. 3773111 describes the following technique. A point on the target corresponding to points on the 2 images is obtained, and the degree of forward tilt/backward tilt is estimated from the result. Then, the distance between specific portions in the projected image is measured and the degree around the vertical axis is estimated based on the above. One of the images is deformed based on the estimated degree and depth, and the difference image is generated.

According to the technique described above, the degree of forward tilt/backward tilt and the degree around the body axis is estimated and the processing is performed. Therefore, the misalignment of the position due to the forward tilt, the backward tilt and the rotation around the body axis can be corrected. However, the misalignment of the position due to oblique incidence cannot be corrected. Therefore, when the oblique incidence occurs, the artifact in the region drawing the attention of the physician cannot be removed. Moreover, according to the above technique, the tilt of the body is estimated based on information of one portion of the image. Therefore, there tends to be a mistake and it is not possible to stably provide the difference image where the artifact is reduced in the region drawing the attention of the physician.

SUMMARY

The present invention has been made in consideration of the above problems, and it is one of main objects to stably provide a difference image in which the artifact is reduced in the region drawing the attention of the physician and which is easy to interpret even if in the capturing, the subject tilts forward or backward, the subject rotates around the body axis, there is oblique incidence of the X-ray, or the like.

In order to achieve at least one of the above-described objects, according to an aspect of the present invention, there is provided a medical image processing apparatus including:

an emphasizing processing unit which performs processing to emphasize a specific structure among structures composing a subject on each of a first image and a second image obtained by capturing the same subject at different points in time;

a positioning unit which matches a position of the specific structure in the first image and the second image based on the first image and the second image with the specific structure emphasized; and a difference image generating unit which generates a difference image between the first image and the second image with the position of the specific structure matched.

According to another aspect of the present invention, there is provided a computer-readable storage medium having a program stored thereon for controlling a computer to function as:

an emphasizing processing unit which performs processing to emphasize a specific structure among structures composing a subject on each of a first image and a second image obtained by capturing the same subject at different points in time;

a positioning unit which matches a position of the specific structure in the first image and the second image based on the first image and the second image with the specific structure emphasized; and a difference image generating unit which generates a difference image between the first image and the second, image with the position of the specific structure matched.

BRIEF DESCRIPTION OF THE DRAWINGS

The present invention will become more fully understood from the detailed description given hereinbelow and the appended drawings, and thus are not intended to define the limits of the present invention, and wherein;

FIG. 3 is a flowchart showing difference image generating processing performed by a control unit shown in FIG. 1;

FIG. 4 is a diagram schematically showing a present image of a thoracic portion X-ray image, a past image of the same subject, and a difference image generated after positioning by the conventional method using the present image and the past image;

FIG. 6 is a graph showing a y-coordinate movement amount of a movement amount vector in position A-A' when conventional local matching processing is performed on 2 images shown in FIG. 5A and FIG. 5B with the positions of the structures misaligned with each other and a result of polynomial fitting of the y-coordinate movement amount;

FIG. 7 is a diagram showing an example of a vertical component emphasizing filter;

FIG. 11 is a diagram showing an example of a corresponding relation between each filter shown in FIG. 10 and a range of degree θ formed by a target pixel (i, j) and an x direction;

FIG. 12 is a graph showing a y-coordinate movement amount of a movement amount vector in position A-A' when emphasizing processing of the back rib bone is performed on 2 images shown in FIG. 5A and FIG. 5B with the positions of the structures misaligned with each other and then local matching processing is performed and a result of polynomial fitting of the y-coordinate movement amount;

FIG. 13 is a graph showing a y-coordinate movement amount of a movement amount vector in position A-A' when emphasizing processing of the blood vessel and bronchus is performed on 2 images shown in FIG. 5A and FIG. 5B with the positions of the structures misaligned with each other and then local matching processing is performed and a result of polynomial fitting of the y-coordinate movement amount;

DETAILED DESCRIPTION OF PREFERRED EMBODIMENTS

An embodiment of the present invention is described in detail with reference to the drawings. However, the scope of the claims is not limited to the illustrated examples.

[Configuration of X-Ray Image System 100]

First, the configuration is described.

Figure 1:
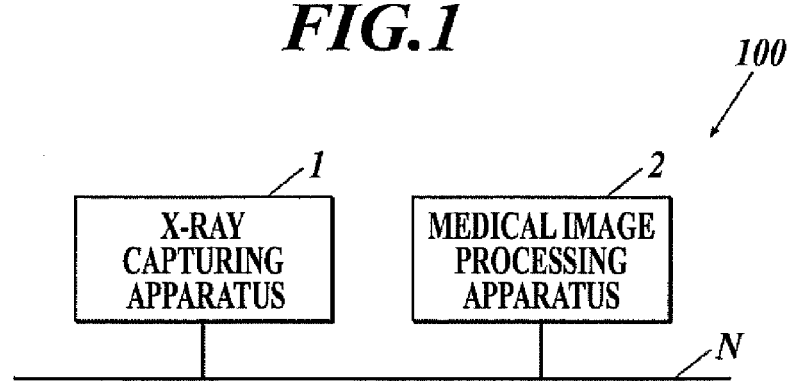
FIG. 1 is a diagram showing an entire configuration of an X-ray image system of the present embodiment.

FIG. 1 shows an X-ray image system 100 according to the present embodiment. The X-ray image system 100 is a system applied to a relatively small medical facility such as a general practioner or a clinic. An X-ray capturing apparatus 1 and a medical image processing apparatus 2 are connected to each other so as to be able to transmit and receive data through a communication network N such as a LAN (Local Area Network), etc.

The X-ray capturing apparatus 1 includes a FPD (Flat Panel Detector) apparatus, CR (Computed Radiography) apparatus, etc. The X-ray capturing apparatus 1 includes an X-ray source and an X-ray detector (FPD and CR cassette). An X-ray is irradiated to the subject positioned between the above, an X-ray transmitted through the subject is detected, a digital medical image is generated, and the medical image is output to the medical image processing apparatus 2. The medical image is output to the medical image processing apparatus 2 corresponded with patient information, capturing site, capturing date, and the like.

Figure 2:
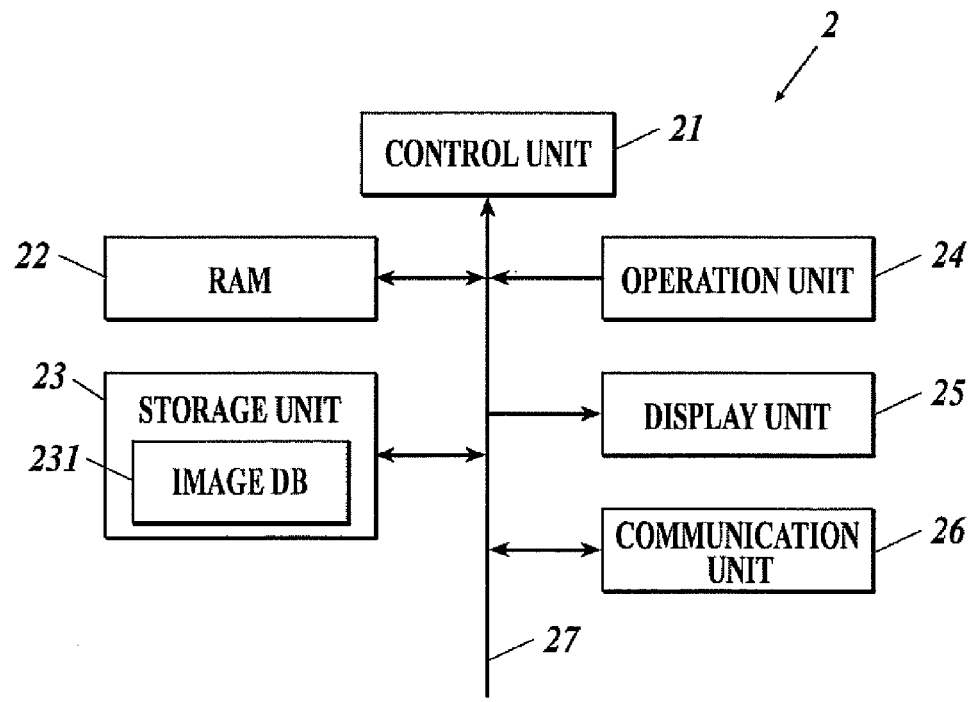
FIG. 2 is a block diagram showing a functional configuration of a medical image processing apparatus shown in FIG. 1.

The medical image processing apparatus 2 performs various processing on the medical image input from the X-ray capturing apparatus 1 and displays the medical image for interpretation. As shown in FIG. 2, the medical image processing apparatus 2 includes a control unit 21, a RAM 22, a storage unit 23, an operation unit 24, a display unit 25, a communication unit 26, and the like, and each unit is connected to each other through a bus 27.

The control unit 21 includes a CPU (Central Processing Unit), etc., which reads out various programs such as a system program, a processing program, etc. stored in a storage unit 23, and expands the program in the RAM 22. Various processing such as later descried difference image generating processing are performed according to the expanded program so that the control unit 21 functions as an emphasizing processing unit, a positioning unit, a difference image generating unit and a display control unit.

The RAM 22 forms a work area for temporarily storing various programs read from the storage unit 23 and performed by the control unit 21, input or output data, parameters, and the like used in the various processing performed by the control unit 21.

The storage unit 23 includes a HDD (Hard Disk Drive), a semiconductor nonvolatile memory or the like. As described above, the storage unit 23 stores various programs and data necessary to perform the program (for example, vertical component emphasizing filter shown in FIG. 7, direction emphasizing filter shown in FIG. 10, correspondence table shown in FIG. 11, etc.). The storage unit 23 is provided with an image DB 231 which stores the medical image input from the X-ray capturing apparatus 1, the difference image generated in the medical image processing apparatus 2, and the like corresponded with the patient information, capturing site, date, etc.

The operation unit 24 includes a keyboard including a cursor key, a numeral input key, various function keys, etc., and a pointing device such as a mouse. The operation unit 24 outputs a pressed signal of the key pressed on the keyboard and the operation signal of the mouse as the input signal to the control unit 21.

The display unit 25 includes a monitor such as a CRT (Cathode Ray Tube), an LCD (Liquid Crystal Display), etc., and displays various screens according to an instruction of a display signal input from the control unit 21.

The communication unit 26 includes a network interface, etc., and transmits and receives data between an external device connected to a communication network N through a switching hub.

[Operation of X-Ray Image System 100]

Next, the operation of the X-ray image system 100 is described.

First, the capturing of the subject is performed with the X-ray capturing apparatus 1. Here, the positions of the X-ray source and the X-ray detector are adjusted so that the X-ray source and the X-ray detector are opposed to each other, and the subject site is positioned between the above to perform capturing. When the subject site is the thoracic portion, the subject is positioned between the X-ray source and the X-ray detector so that the back side of the subject faces the X-ray source side, and the X-ray capturing is performed. The medical image obtained by capturing is associated with additional information such as patient information, capturing site (subject site), capturing date and time, etc., and transmitted to the medical image processing apparatus 2 through the communication network N.

In the medical image processing apparatus 2, when the medical image is received from the X-ray capturing apparatus 1 by the communication unit 26, the control unit 21 stores the received medical image in the image DE 231 associated with the patient information, capturing site, capturing date and time, etc., and displays the image on the display unit 25. When the capturing site of the received medical image is the thoracic portion, the difference image display button (not shown) to instruct display of the difference image is displayed together with the received medical image (called the present image) on the display unit 25. When the difference image display button is pressed on the operation unit 24, the control unit 21 displays on the display unit 25 the selection column to select the past image of the thoracic portion of the same patient, and when the past image is selected on the operation unit 24, the control unit 21 reads the past image selected from the image DB 231 and performs difference image generating processing described below to generate the difference image between the present image (first image) and the selected past image (second image).

FIG. 3 shows a flowchart of the difference image generating processing performed by the control unit 21. The difference image generating processing is performed by the control unit 21 in coordination with the program stored in the storage unit 23.

First, the control unit 21 inputs the selected past image in the RAM 22 as the processing target (step S1) and performs pre-processing on the past image (step S2). Similarly, the control unit 21 inputs the present image in the RAM 22 as the processing target (step S3), and performs pre-processing on the present image (step S4).

For example, as shown in Japanese Patent Application Laid-Open Publication No. 2005-176462, the following is performed as pre-processing, non-linear density correction, matrix size reduction, contrast emphasis, and/or edge blurring.

Next, the control unit 21 performs global matching processing and performs general positioning of the lung field region between the present image and the past image (step S5).

For example, as described in Japanese Patent Application Laid-Open Publication No. 2004-164298, the global matching processing is a well-known image processing technique. In the global matching processing, first, the lung field region is extracted from each of the present image and the past image. The lung field region can be extracted according to a well-known image analysis technique such as the technique described in U.S. Pat. No. 4,851,954. Next, a plurality of pairs of corresponding points which are features are obtained on the outline of the lung field (rib cage) of the present image and the past image and the shift vector (movement amount vector) between the corresponding points is calculated. Next, affine transformation is performed on either one of the present image or the past image (here, the past image) based on the shift vector. With this, the lung field region which is the subject region of one of the images is generally matched to the lung field region of the other image.

Next, the control unit 21 sets a large number of template region of interest (template ROI) at an even interval in the vertical and horizontal directions in the lung field region of the present image (step S6). Moreover, the control unit 21 sets a search region (search ROI) corresponding to each template ROI in an even interval in the vertical and horizontal directions in the lung field region of the past image (step S7). The size of the search ROI is larger than the template ROI. An experimentally and empirically suitable size for the template ROI and the search ROI is employed.

Next, the control unit 21 performs processing to emphasize a specific structure as the target of positioning in each of the past image and the present image (step S8).

Step S8 is characteristic processing of the present embodiment. If forward/backward tilt of the subject, rotation around the body axis, oblique incidence of the X-ray, etc. occurs when at least either one of the images is captured, and the position of the structure (anatomical structure such as, front rib bone, back rib bone, blood vessel and bronchus, collarbone, heart, etc.) in the lung field is misaligned in the present image and the past image, the structures cannot be matched even if positioning by local matching processing and warping processing is performed. This causes the problem of normal structures remaining in the difference image.

FIG. 4 schematically shows a present image G1 of the thoracic portion X-ray image, a past image G2 of the same subject, and a difference image generated after positioning by the conventional method (method which does not perform emphasizing processing of step S8 before local matching processing) using the present image G1 and the past image G2. In FIG. 4, B shows back rib bone, V shows blood vessel and bronchus, and D shows lesion. As shown in FIG. 4, in the thoracic portion X-ray image, especially the back rib bone B and the blood vessel and the bronchus V are noticeable structures which occupy a large region of the lung field. When forward/backward tilt of the subject, rotation around the blood axis or oblique incidence occur in either of the present image G1 or the past image G2 and the position of the back rib bone B and the blood vessel and the bronchus V are misaligned in the images, the position is not matched in any of the structures. As a result, such structures remain in the difference image G3, and the resulting image is an image in which the lesion D is difficult to see and the interpretation is very difficult.

In the local matching processing, the position with the highest correlation in the search ROI is selected as the corresponding position for each template ROI. The movement amount vector to move the center of each template ROI to the center of the corresponding position is obtained, and the obtained movement amount vector is approximated with a n-dimensional polynomial equation (polynomial fitting) to calculate the movement amount vector of each pixel. When there is no misalignment in the position of the structure in the present image and the past image, since the correct corresponding position is found in the local matching processing, positioning to match each structure can be performed. However, when the position of the structure in the present image and the past image is misaligned, the position is not matched to any of the structures.

Figure 5A:
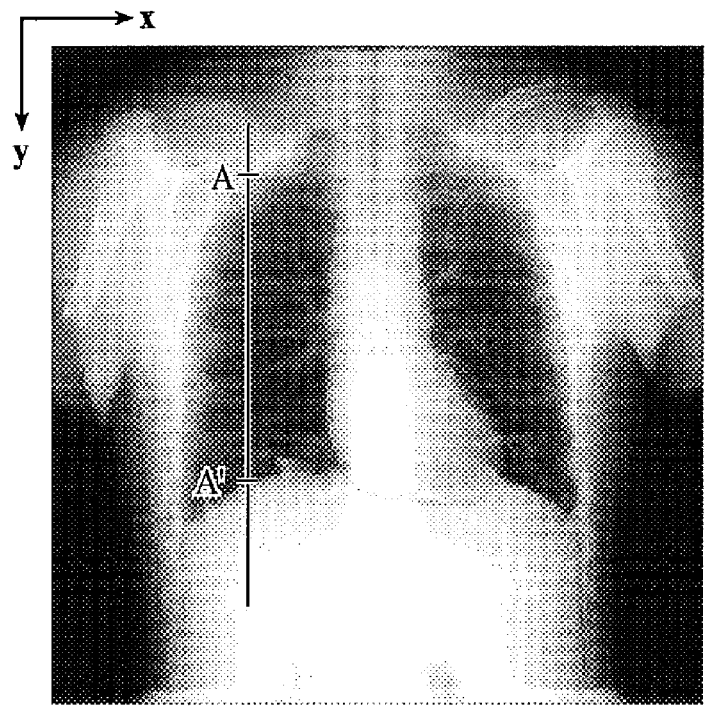
FIG. 5A is an image of a thoracic portion phantom captured by X-ray in a state where there is no forward/backward tilt, body axis rotation, oblique incidence etc.
Figure 5B:
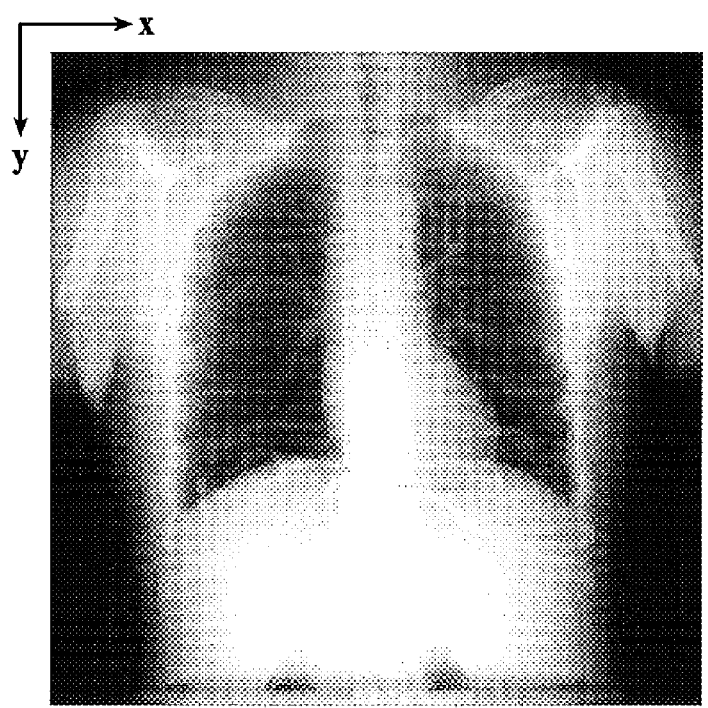
FIG. 5B is an image of the thoracic portion phantom shown in FIG. 5A captured by X-ray tilted backward by 12°.

FIG. 6 shows a y-coordinate movement amount of the movement amount vector in the A-A' position when the local matching processing is performed on 2 images where the positions of the structures are misaligned as shown in FIG. 5A and FIG. 5B and the result of the polynomial fitting of the y-coordinate movement amount. The image shown in FIG. 5A is an image of capturing the thoracic portion phantom with an X-ray without forward/backward tilt, body axis rotation, oblique incidence, etc. (thoracic portion phantom image) and the image shown in FIG. 5B is an image of capturing the same phantom as FIG. 5A tilted backward by 12°.

When there is misalignment in the position of the structures as in the 2 images shown in FIG. 5A and FIG. 5B, the original corresponding position is different for each structure in the portion where a plurality of structures are included in 1 template ROI. However, in the local matching processing, the position with the highest cross correlation value in the search ROI corresponding to each template ROI is selected as the corresponding position of the template ROI. Therefore, the corresponding position is selected from the search ROI based on the characteristic structure in each template ROI. Consequently, viewing the lung field as a whole, the corresponded structure in each template ROI is varied. With this, as shown in FIG. 6, the magnitude and direction of the movement amount vector to the corresponding position is varied depending on the position, and even if the polynomial fitting is performed for each movement amount vector and the movement amount vector of each pixel is calculated, the result of the fitting does not match any edge of the structure. For example, FIG. 6 shows a change of the edge of the back rib bone and the change of the edge of the blood vessel and the bronchus, but the fitting result does not match with any of the changes of the edge. As a result, positioning which does not match with any of the structures is performed.

In step S8, processing to emphasize the specific structure as the target of positioning is performed on each of the present image and the past image, and the image is characterized so that the corresponding position is determined based on the feature of the structure in the template ROI including the specific structure.

Here, in the difference image of the thoracic portion X-ray image, the back rib bone which spreads throughout the entire lung field region is a noticeable structure which especially influences the interpretation. When the area in the periphery of the blood vessel and the bronchus is interpreted, the blood vessel and the bronchus influences the interpretation. Therefore, in the present embodiment, (A) the back rib bone and (B) the blood vessel and the bronchus are the specific structures as the target of positioning, and processing to emphasize each structure is performed.

Figure 7:
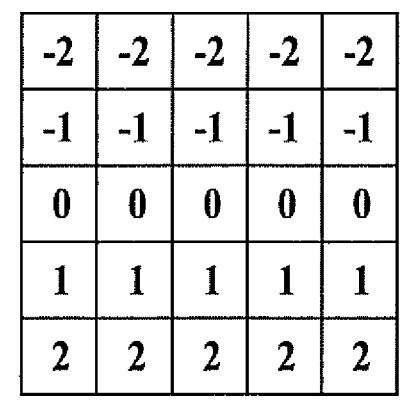
Figure 8A:
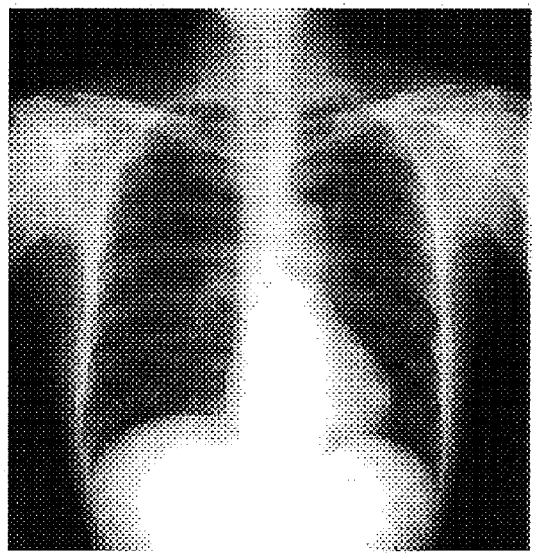
FIG. 8A is a diagram showing an example of an original image.
Figure 8B:
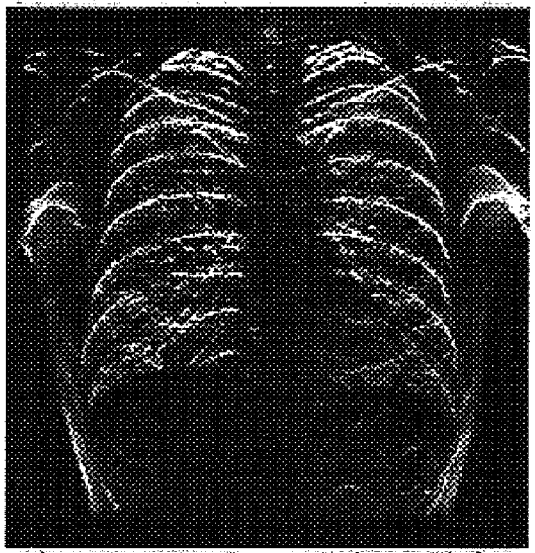
FIG. 8B is an image on which the vertical component emphasizing processing is performed on the original image shown in FIG. 8A.
Figure 8C:
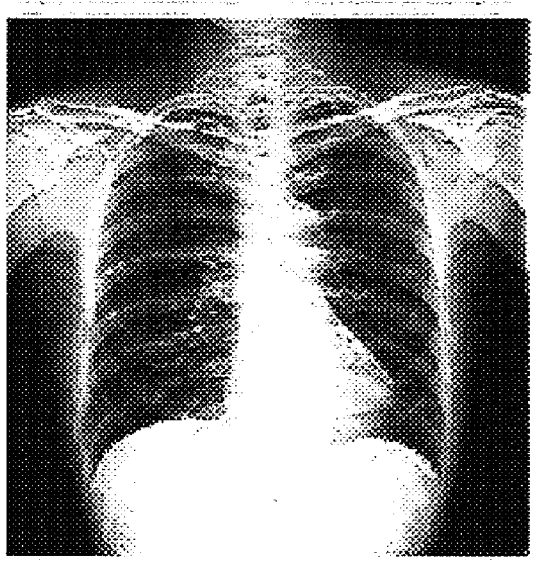
FIG. 8C is an emphasizing image of a back rib bone generated by adding the images shown in FIG. 8A and FIG. 8B.

Specifically, when the (A) back rib bone is the target of positioning, each of the present image and the past image is filtered with the vertical component emphasizing filter shown in FIG. 7, the original image (see FIG. 8A) and the filtered image (see FIG. 8B) are added, and the emphasizing image of the back rib bone (see FIG. 8C, emphasized image of each of the present image and the past image) is generated.

Figure 9:
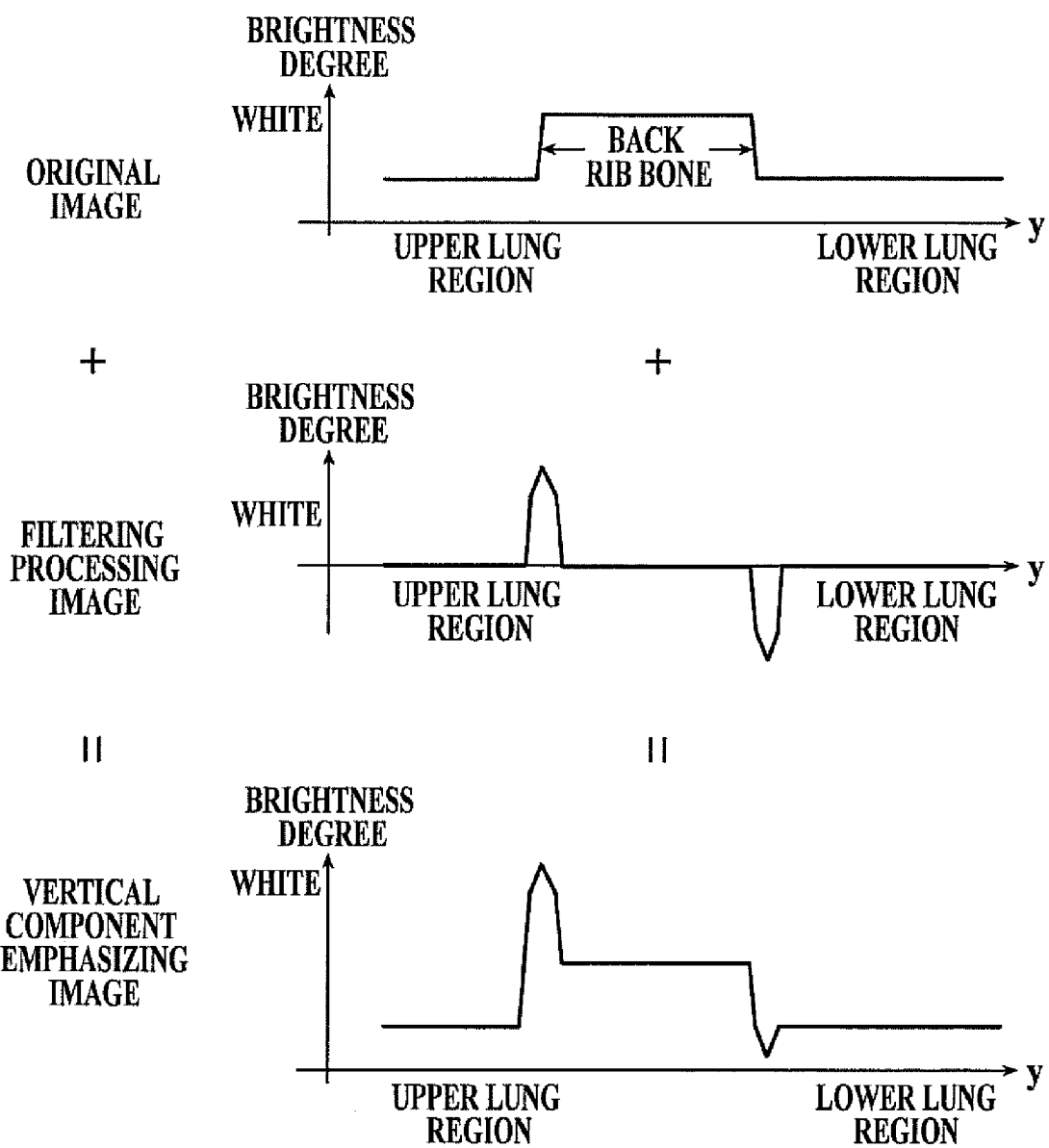
FIG. 9 is a diagram schematically showing a pixel value of a back rib bone portion in each image of emphasizing processing in step S8 shown in FIG. 3.

The vertical component emphasizing filter as shown in FIG. 7 is a filter made based on the structural feature that the back rib bone is aligned with even intervals vertically, and the filter size matches the size of the back rib bone. With this filter, as shown in the conceptual diagram of the pixel value of the back rib bone portion in each image of FIG. 9, the edge of the back rib bone in the original image can be emphasized in the vertical direction. With the vertical component emphasizing filter, it is possible to make the back rib bone noticeable. Moreover, by characterizing the vertical direction component and to make a feature so that the top and bottom of the back rib bone is not mistaken, it is possible to make an original image which does not exist in clinical practice but contributes to positioning.

Figure 10:
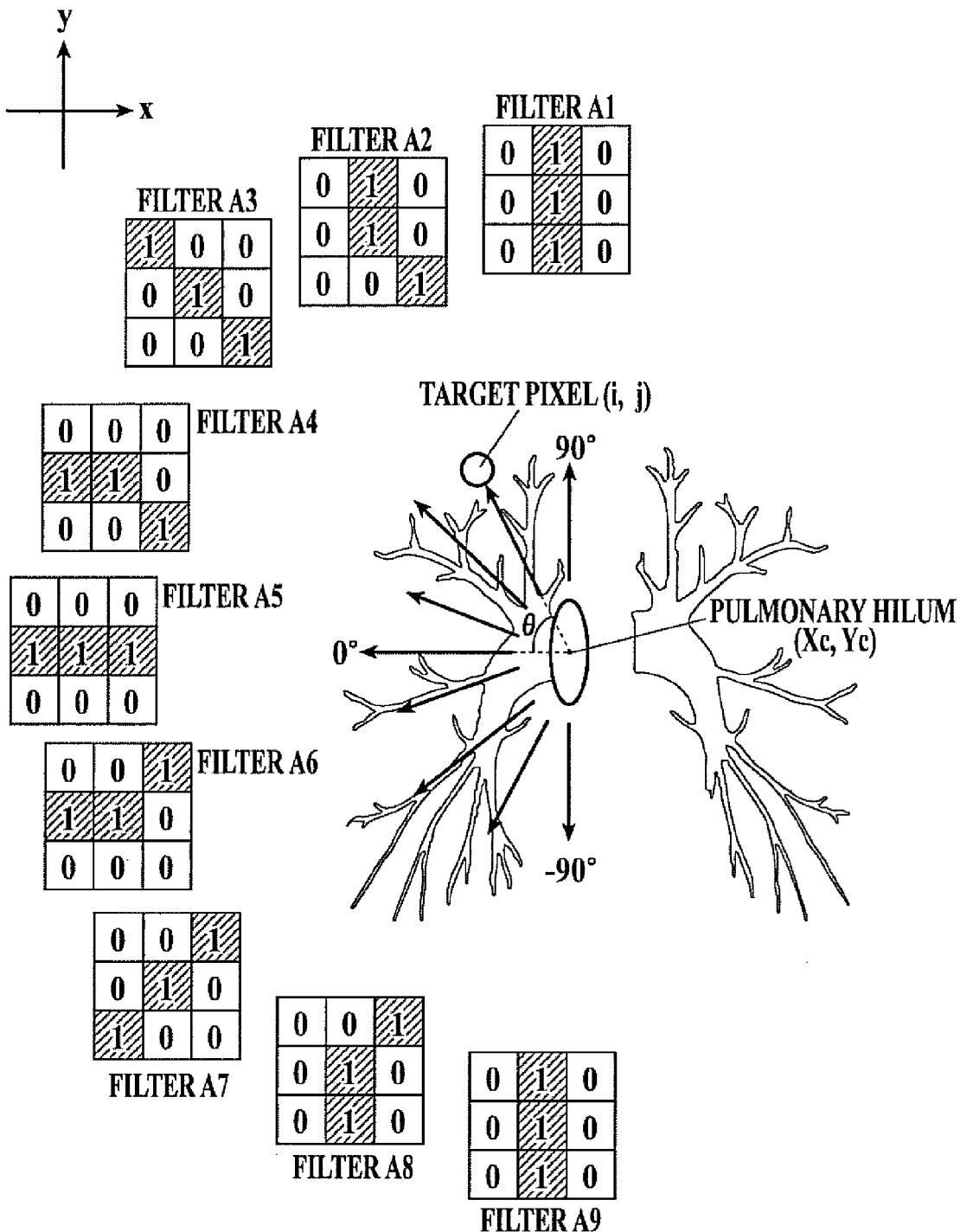
FIG. 10 is a diagram showing an example of a direction emphasizing filter.

When (B) the blood vessel and the bronchus are the targets of positioning, each of the present image and the past image are filtered with the direction emphasizing filter shown in FIG. 10, the original image and the filtered image are added, and the emphasizing image (emphasizing image of each of the present image and the past image) of the blood vessel and the bronchus is generated.

Here, as shown in FIG. 10, the blood vessel and the bronchus of the lung field have a form which radially spreads from a pulmonary hilum. The direction emphasizing filter is a filter which emphasizes the form which radially spreads from the starting point (pulmonary hilum) based on the feature of the blood vessel and the bronchus, and a plurality of filters (here, Filter A1 to Filter A9) are prepared for each of the right lung field and the left lung field (stored in the storage unit 23). As shown in FIG. 10, the Filter A1 to Filter A9 are associated with a range of a degree θ formed between the target pixel (i, j) and the x-direction, and the filter suitable for the position of the target pixel is used.

In FIG. 10, the left lung field filter is shown as an example. Each right lung field filter is the filter with the left and right of the left lung field filter inverted.

Processing to emphasize the blood vessel is performed by the following.

(1) First, the pulmonary hilum (Xc, Yc) which is to be the starting point is set. The pulmonary hilum (Xc, Yc) is set by displaying each of the present image and the past image on the display unit 25, and the physician specifying the pulmonary hilum (Xc, Yc) on each displayed image with the operation unit 24.

(2) Next, the relation of the positions of the target pixel (i, j) and the pulmonary hilum (Xc, Yc) is determined on each of the present image and the past image.

Specifically, a vector V from the pulmonary hilum (Xc, Yc) to the target pixel (i, j) and an angle θ (see FIG. 10) are calculated.

Here, vector $V=(Xc-i, Yc-j)$ angle $\theta=\arctan\{(Yc-j)/(Xc-i)\}$ (3) The filter according to the range of the angle θ is selected from the Filter A1 to Filter A9 based on the correspondence table shown in FIG. 11, and the filtering processing is performed.

(4) The resulting value of the filtering processing and the pixel value of the original image are added.

(5) The above processing of (1) to (4) is repeated shifting the target pixel one pixel at a time until the above processing ends for all of the pixels in the original image.

According to the above emphasizing processing, the structure of radially spreading from the pulmonary hilum, in other words, the emphasizing image with the blood vessel emphasized can be obtained.

The blood vessel and the bronchus include a component with a higher frequency than the bone component. Therefore, the blood vessel and the bronchus can be emphasized by using a filter which emphasizes a component with a finer and higher frequency than the bone component (8 mm to 20 mm) on the present image and the past image. Here, as the filter which emphasizes the high frequency, an un-sharp mask filter, a sobel filter, a laplacian filter or the like can be used. After Fourier transformation on each of the present image and the past image and passing through a high-pass filter, inverse Fourier transformation can be performed to emphasize the high frequency component, and with this, the blood vessel can be emphasized.

Next, the control unit 21 performs local matching processing with the present image and the past image with the specific structure as the target of positioning emphasized as the input image (step S9). In other words, while each template ROI in the present image with the specific structure emphasized is moved in the corresponding search ROI in the past image with the specific structure emphasized, the cross correlation value $R_{i,j}$ is calculated. The position with the highest cross correlation value $R_{i,j}$ is selected as the corresponding position of the template ROI, and the movement amount vector from the center of the template ROI to the center of the corresponding position is calculated.

The cross correlation value $R_{i,j}$ can be calculated by the [Formula 1] below.

$$R_{i,j} = \frac{1}{IJ}\sum_{j=1}^{J}\sum_{i=1}^{I} \frac{\{A(i,j)-m_A\}\{B(i,j)-m_B\}}{\sigma_A \sigma_B}$$ [Formula 1]

$$m_A = \frac{1}{IJ}\sum_{j=1}^{J}\sum_{i=1}^{I} A(i,j)$$

$$m_B = \frac{1}{IJ}\sum_{j=1}^{J}\sum_{i=1}^{I} B(i,j)$$

$$\sigma_A = \sqrt{\frac{1}{IJ}\sum_{j=1}^{J}\sum_{i=1}^{I}\{A(i,j)-m_A\}^2}$$

$$\sigma_B = \sqrt{\frac{1}{IJ}\sum_{j=1}^{J}\sum_{i=1}^{I}\{B(i,j)-m_B\}^2}$$

$A(i, j)$: PIXEL VALUE POSITIONED IN COLUMN $i$ ROW $j$ IN TEMPLATE ROI $B(i, j)$: PIXEL VALUE POSITIONED IN COLUMN $i$ ROW $j$ IN CORRESPONDING REGION OF SEARCH ROI $I$: MAXIMUM COLUMN ($i = 1, 2, \cdots, I$)

$J$: MAXIMUM ROW ($j = 1, 2, \cdots, J$)

Next, the control unit 21 maps the distribution of the movement amount vector corresponding to each template ROI (step S10), the mapped movement amount vector is fitted using the n-dimensional polynomial equation (polynomial equation fitting), and the movement amount vector of each pixel is obtained (step S11).

FIG. 12 shows a y-coordinate movement amount of the movement amount vector in the A-A' position when the processing to emphasize the back rib bone is performed on the 2 images with the position of the structure misaligned as shown in FIG. 5A and FIG. 5B and then the local matching processing is performed on the 2 images with the back rib bone emphasized, and the result of the polynomial equation fitting of the y-coordinate movement amount.

As shown in FIG. 12, as a result of the polynomial equation, it is possible to see that a curve similar to the change of the edge of the back rib bone is obtained.

FIG. 13 shows a y-coordinate movement amount of the movement amount vector in the A-A' position when the processing to emphasize the blood vessel and the bronchus is performed on the 2 images with the position of the structure misaligned as shown in FIG. 5A and FIG. 5B and then the local matching processing is performed on the 2 images with the blood vessel and the bronchus emphasized, and the result of the polynomial equation fitting of the y-coordinate movement amount.

As shown in FIG. 13, as a result of the polynomial equation, it is possible to see that a curve similar to the change of the edge of the blood vessel and the bronchus is obtained.

FIG. 12 and FIG. 13 show only the y-coordinate movement amount, but the curve similar to the change of the back rib bone and the curve similar to the change of the blood vessel and the bronchus can be similarly obtained with the x-coordinate movement amount.

Next, the control unit 21 performs warping processing (non-linear distortion processing) on the past image (input past image without emphasizing) based on the obtained movement amount vector of each pixel (step S12). For example, as described in Japanese Patent Application Laid-Open Publication No. 2005-176462, the warping processing is a well-known image processing technique. After the warping processing, the control unit 21 obtains a difference between the present image (present image without emphasizing) and the deformed past image and generates the difference image (step S13). Specifically, the value of each pixel of the past image is subtracted from the value of the corresponding pixel of the present image, and the difference image is generated.

Figure 14:
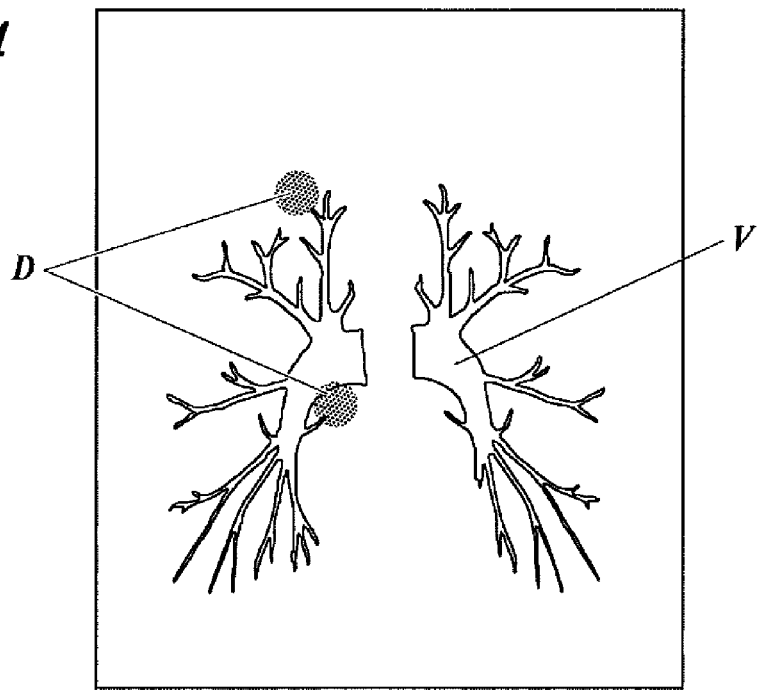
FIG. 14 is a diagram schematically showing a difference image generated when the target of positioning is the back rib bone according to the present embodiment.

FIG. 14 schematically shows the generated difference image when the target of positioning is the back rib bone in step S13. As shown in the graph in FIG. 12, when the local matching processing and the polynomial equation fitting are performed using as input the image where the emphasizing processing of the back rib bone is performed on the present image and the past image with the back rib bone as the target of positioning, a curve similar to the change of the edge of the back rib bone is obtained. When the warping processing is performed on the past image based on the movement amount vector represented by the curve, the back rib bone of the past image is positioned to match the back rib bone of the present image. Therefore, the difference image between the present image and the past image becomes an image where the artifact of the back rib bone becomes very weak (disappears) as shown in FIG. 14. As described above, by performing positioning to match the back rib bone, the back rib bone which is especially a noticeable structure in the thoracic portion X-ray image can be set so as not to appear in the difference image. Therefore, it is possible to provide a difference image which is easy to interpret to the physician. Specifically, it is possible to stably provide a difference image which is easy to interpret when the region around the back rib bone draws attention and is interpreted.

Figure 15:
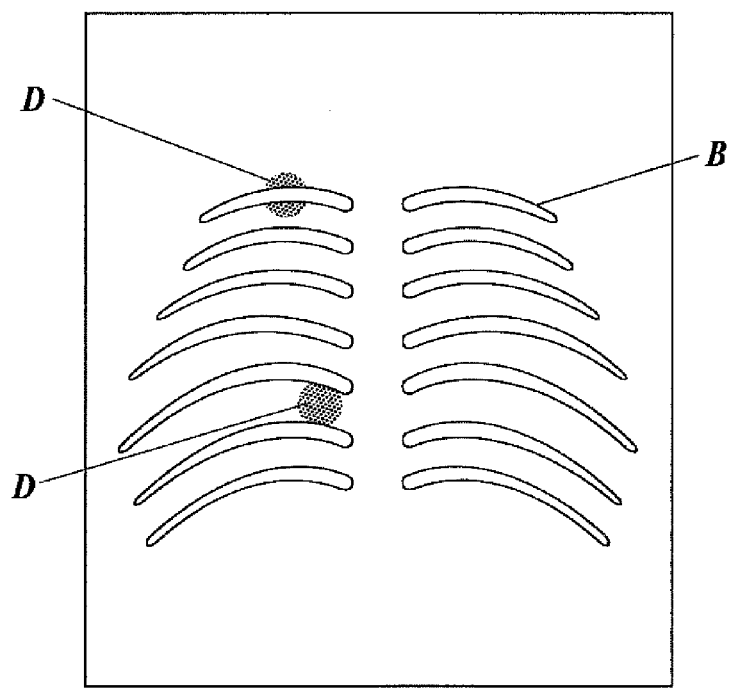
FIG. 15 is a diagram schematically showing the difference image generated when the target of positioning is the blood vessel and the bronchus according to the present embodiment.

FIG. 15 schematically shows the difference image generated when the blood vessel and the bronchus are the target of positioning in step S13. As shown in the graph in FIG. 13, when the local matching processing and the polynomial equation fitting are performed using as input the image where the emphasizing processing of the blood vessel and the bronchus is performed on the present image and the past image with the blood vessel and the bronchus as the target of positioning, a curve similar to the change of the edge of the blood vessel and the bronchus is obtained. When the warping processing is performed on the past image based on the movement amount vector represented by the curve, the blood vessel and the bronchus of the past image is positioned to match the blood vessel and the bronchus of the present image. Therefore, the difference image between the present image and the past image becomes an image where the artifact of the blood vessel and the bronchus becomes very weak (disappears) as shown in FIG. 15. As described above, by performing positioning to match the blood vessel and the bronchus, the blood vessel and the bronchus which are noticeable structures in the thoracic portion X-ray image can be set so as not to appear in the difference image. Therefore, specifically, it is possible to stably provide a difference image which is easy for the physician to interpret when the region around the blood vessel and the bronchus draws attention and is interpreted.

Figure 16A:
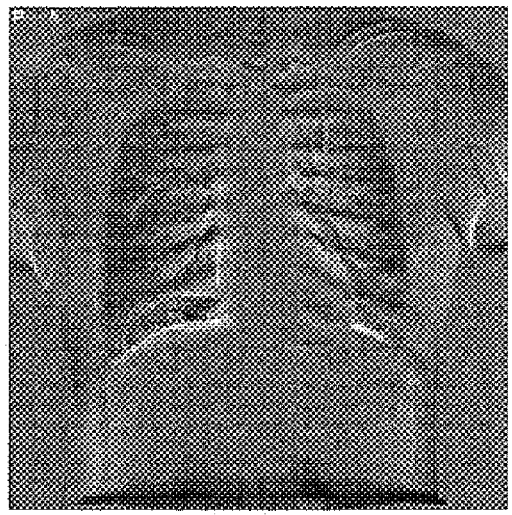
FIG. 16A is a difference image generated by a conventional method.
Figure 16C:
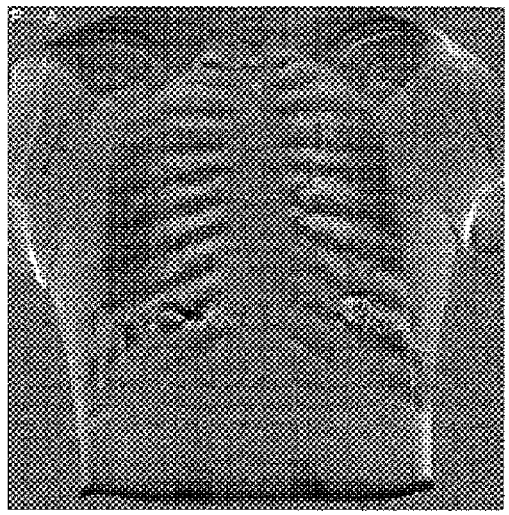
FIG. 16C is a difference image generated by the method of the present embodiment with the blood vessel and the bronchus as the target of positioning.
Figure 16B:
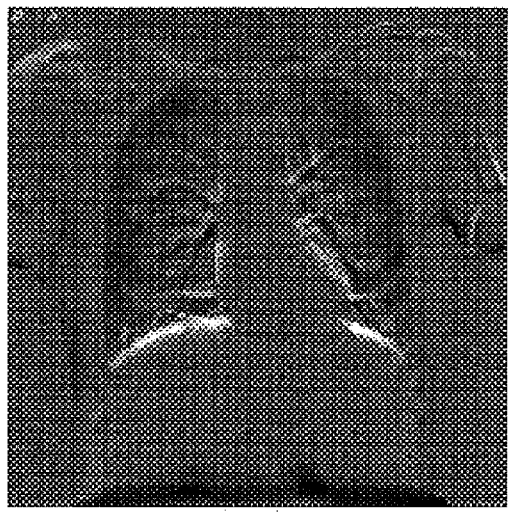
FIG. 16B is a difference image generated by the method of the present embodiment with the back rib bone as the target of positioning.

FIG. 16A to FIG. 16C show a difference image generated using a phantom image of the thoracic portion shown in FIG. 5A and FIG. 5B as the input image. FIG. 16A shows a difference image generated by the conventional method. FIG. 16B shows a difference image generated by the method of the present embodiment with the back rib bone as the target of positioning. FIG. 16C shows a difference image generated by the method of the present embodiment with the blood vessel and the bronchus as the target of positioning.

As shown in FIG. 16A, according to the difference image generated by the conventional method, both the back rib bone and the blood vessel and the bronchus are left and are artifacts. On the other hand, according to the difference image generated with the method described in the present embodiment with the back rib bone as the target of positioning, as shown in FIG. 16B, it can be seen that the back rib bone is made to be very weak. Moreover, according to the difference image generated with the method described in the present embodiment with the blood vessel and the bronchus as the target of positioning, as shown in FIG. 16C, it can be seen that the blood vessel and the bronchus are made to be very weak.

When the generating of the difference image ends, the control unit 21 displays the generated difference image on the display unit 25 (step S14), and the difference image generating processing ends.

For example, in step S14, the control unit 21 displays on the display unit 25 the difference image on which the positioning based on the back rib bone is performed (artifact of the back rib bone is weakened), and also displays the display switch button. When the display switch button is pressed on the operation unit 24, the control unit 21 displays on the display unit 25 the difference image on which the positioning based on the blood vessel and the bronchus is performed (artifact of the blood vessel and the bronchus is weakened). Then, the control unit 21 switches display between the 2 difference images according to the pressing of the display switching button.

As described above, the display can be switched between the difference image with the artifact of the back rib bone weakened and the difference image with the artifact of the blood vessel and the bronchus weakened by operating the operation unit 24. Therefore, even if forward/backward tilt of the subject, rotation around the body axis, oblique incidence of the X-ray, etc. occurs in capturing, it is possible to easily display the difference image which is easy to interpret depending on the region which draws attention of the physician.

Alternatively, the difference image with the artifact of the back rib bone weakened and the difference image with the artifact of the blood vessel and the bronchus weakened can be displayed side by side.

As described above, according to the medical image processing apparatus 2, the control unit 21 performs processing to emphasize the specific structure among the structures composing the subject on each of the present image and the past image obtained by capturing the same subject at different points of time, and the positioning of the specific structure in the present image and the past image is performed based on the present image and the past image with the specific structure emphasized. Then, the difference image is generated with the present image and the past image with the position of the specific structure matched.

Therefore, even if forward/backward tilt of the subject, rotation around the body axis, oblique incidence of the X-ray, etc. occur when either of the present image or the past image to be compared is captured, and as a result, the positions of the structures composing the subject of the 2 images are misaligned, positioning is performed to match the specific structure in the region drawing attention of the physician, for example, the back rib bone spreading in the entire lung field region or the blood vessel and the bronchus, and the difference image is generated. Therefore, it is possible to stably provide a difference image in which the artifact of the specific structure which is in the region drawing attention of the physician and where there is no temporal change is reduced and with this, the difference image becomes easy to interpret.

Moreover, the medical image processing apparatus 2 displays the generated difference image on the display unit 25, and the difference image which can be easily interpreted by the physician can be provided on the monitor.

Moreover, among the structures which compose the subject, for example, a plurality of different structures such as the back rib bone or the blood vessel and the bronchus are set as the specific structure, and a plurality of difference images with the positions of the specific structures matched is generated. The display on the display unit 25 displaying the plurality of difference images can be switched according to user operation. When the physician's attention is drawn to a plurality of regions, the difference images can be provided in a form which is even easier for the physician to interpret.

Specifically, when the specific structure is the back rib bone, filtering processing to emphasize the edge of the vertical component is performed on the present image and the past image, and the image on which filtering processing is performed is added to the original image so as to be able to generate an image with the back rib bone emphasized.

When the specific structure is the blood vessel and the bronchus, filtering processing to emphasize the shadow radially spreading from the pulmonary hilum is performed on the present image and the past image, and the image on which filtering processing is performed is added to the original image or the emphasizing processing which emphasizes the high frequency component is performed so as to be able to generate the image with the blood vessel and the bronchus emphasized.

Then, local matching processing is performed on the present image and the past image with the specific structure emphasized, and the corresponding position in the present image and the past image is specified to calculate the movement amount vector showing the shift. Then, either the present image or the past image is deformed based on the movement amount vector so as to be able to match the positions of the specific structure in the present image and the past image.

The description in the above described present embodiment is a suitable example of the present invention, but the present invention is not limited to the above.

For example, according to the present embodiment described above, the structure as the target of positioning is the back rib bone and the blood vessel, and the local matching processing is performed based on the image emphasizing the above structures. However, other structures such as the rib cage, mediastinum, diaphragm, collarbone, heart, front rib bone, etc. can be the target of positioning, and the local matching processing can be performed based on the image emphasizing the above.

Preferably, when the blood vessel and the bronchus are the target of positioning, BS (Bone Suppression) processing is performed in advance on the input present image and past image. BS processing is processing in which the bone is identified and the component of the bone is reduced or the density of the component of the bone is reduced (for example, see http://www.reveraintech.com/products/bone-suppression). The bone component which is the main component in the thoracic portion X-ray image is reduced in advance, then the blood vessel and the bronchus are emphasized, and then the local matching to fitting of the movement amount vector is performed. With this, it is possible to perform positioning which is more suitable for the blood vessel and the bronchus. Moreover, together with the component of the blood vessel and the bronchus, the component of the bone can be removed from the difference image, and the difference image in which the artifact is further suppressed can be obtained.

Figure 16D:
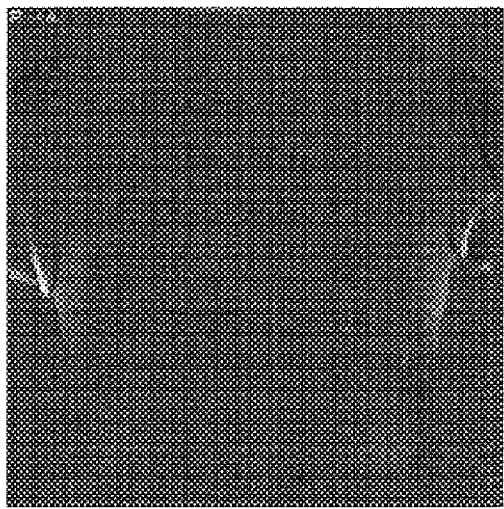
FIG. 16D is a difference image generated by the method of the present embodiment after performing BS processing.
Figure 17A:
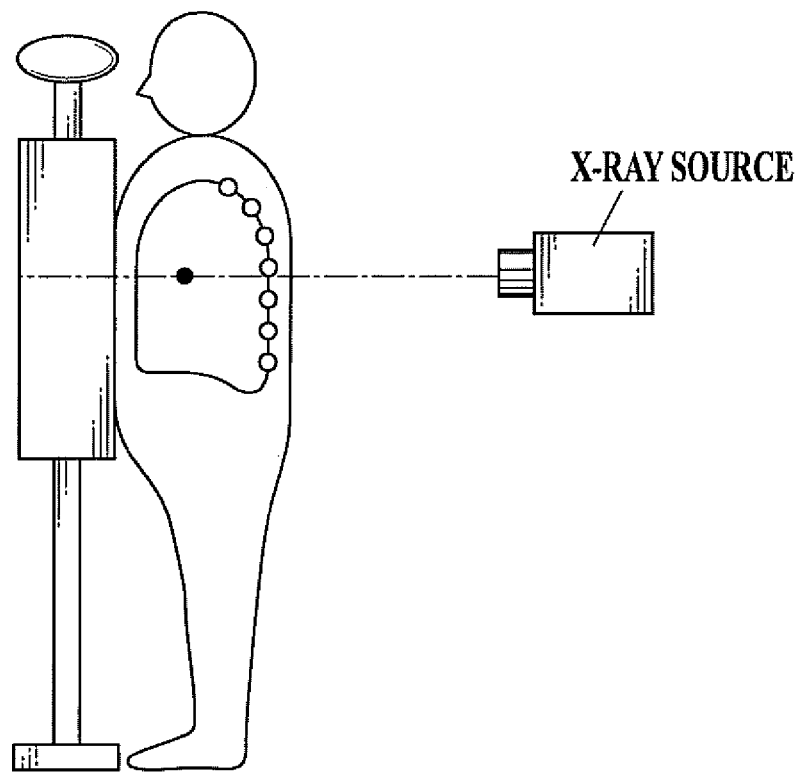
FIG. 17A is a diagram showing capturing in a normal posture.
Figure 17B:
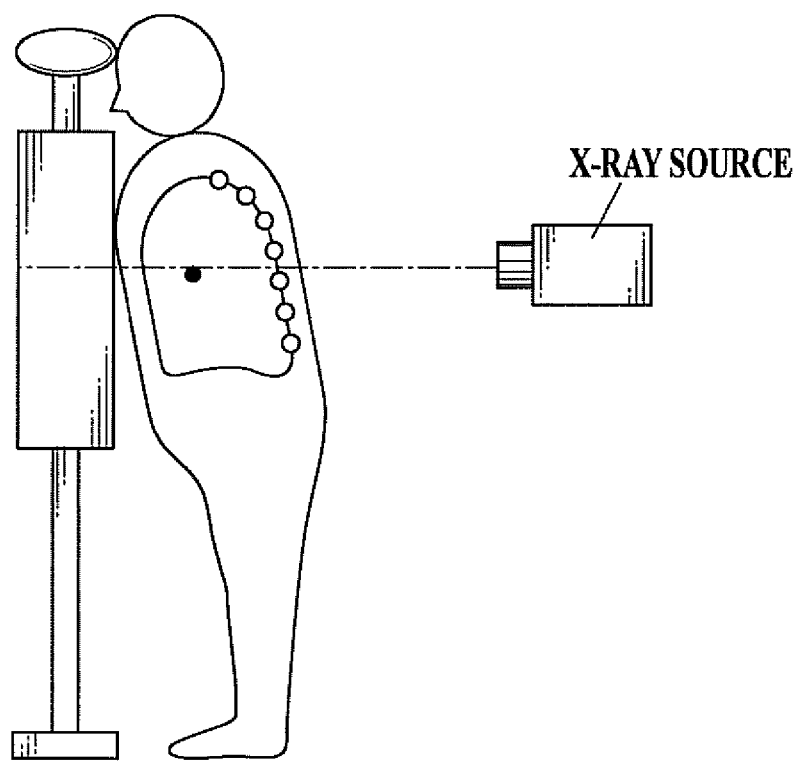
FIG. 17B is a diagram showing capturing with the subject tilted forward.
Figure 18:
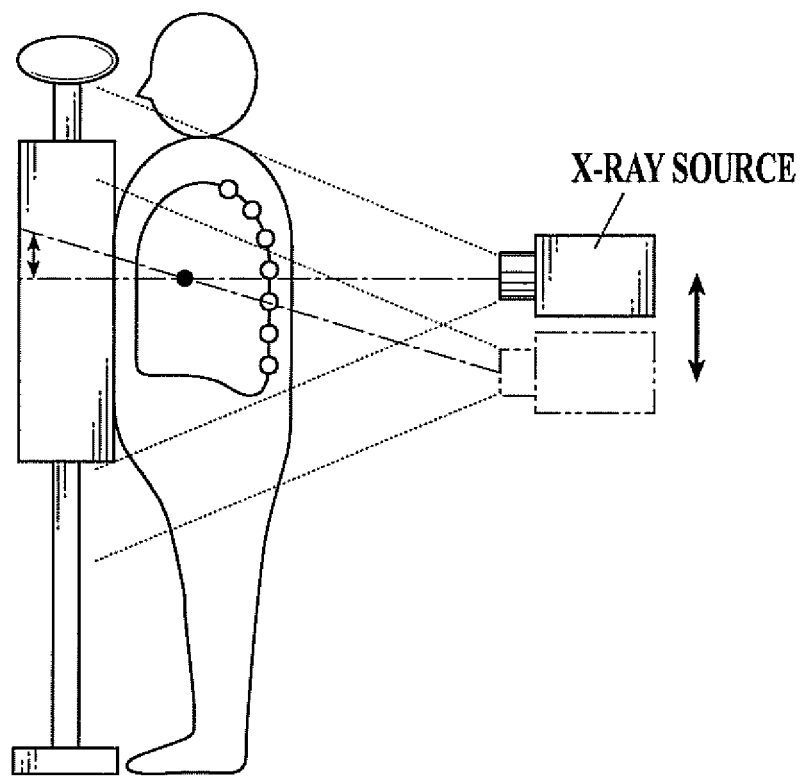
FIG. 18 is a diagram showing capturing with oblique incidence.

FIG. 16D shows a difference image where the phantom images of the thoracic portion shown in FIG. 5A and FIG. 5B are the input images, BS processing is performed on the images and then the difference image is generated by the difference image generating processing with the blood vessel and the bronchus as the target of the positioning. As shown in FIG. 16D, it is possible to obtain a difference image without artifacts of both the back rib bone and the blood vessel and the bronchus.

According to the present embodiment described above, the difference image generated with the back rib bone as the target of positioning and the difference image generated with the blood vessel and the bronchus as the target of positioning are generated and the display of the above is switched according to user operation. Alternatively, only one of the difference images selected in advance can be generated and the difference image can be displayed on the display unit 25.

For example, according to the present embodiment described above, the difference image is generated using a thoracic portion X-ray image captured with an X-ray capturing apparatus. However, the present image can be applied to a difference image generated with an image capturing another site using another modality.

According to the present embodiment, the template ROI is set in the present image, the search ROI is set in the past image and the local matching processing is performed. However, the search ROI can be set in the present image, and the template ROI can be set in the past image. According to the present embodiment, warping processing is performed on the past image, however, the warping processing can be performed on any image.

For example, the above described description discloses an example using a HDD, a nonvolatile memory, etc. as a computer readable medium storing the program which performs the various processing, however, the present invention is not limited to the above example. As other computer readable media, it is possible to apply a portable storage medium such as a CD-ROM, etc. Moreover, as the medium providing data of the program through the communication line, a carrier wave can be applied.

Other than the above, the detailed configuration and the detailed operation of each apparatus composing the X-ray image system can be suitably modified without leaving the scope of the present invention.

What is claimed is:

1. A medical image processing apparatus comprising:
an emphasizing processing unit which performs processing to emphasize a specific structure among structures composing a subject on each of a first image and a second image obtained by capturing the same subject at different points in time;
a positioning unit which matches a position of the specific structure in the first image and the second image based on the first image and the second image with the specific structure emphasized; and
a difference image generating unit which generates a difference image between the first image without emphasizing processing and the second image without emphasizing processing with the position of the specific structure matched,
wherein, the first image and the second image are thoracic portion X-ray images and the specific structure is a back rib bone, and
wherein the emphasizing processing unit performs filtering processing which emphasizes an edge of a vertical component on the first image and the second image, and emphasizes the back rib bone by adding an image on which the filtering processing is performed and an original image.

2. The medical image processing apparatus of claim 1, further comprising a display unit which displays the difference image.

3. The medical image processing apparatus of claim 2, wherein,
a plurality of different structures among the structures composing the subject are set as the specific structures and a plurality of difference images are generated by the emphasizing processing unit, the positioning unit and the difference image generating unit with the position of each of the plurality of specific structures matched, the medical image processing apparatus further comprising a display control unit which controls the display unit so that display of the plurality of difference images with the position of each of the plurality of specific structures matched can be switched according to user operation.

4. A medical image processing apparatus, comprising:
an emphasizing processing unit which performs processing to emphasize a specific structure among structures composing a subject on each of a first image and a second image obtained by capturing the same subject at different points in time;
a positioning unit which matches a position of the specific structure in the first image and the second image based on the first image and the second image with the specific structure emphasized; and
a difference image generating unit which generates a difference image between the first image without emphasizing processing and the second image without emphasizing processing with the position of the specific structure matched,
wherein the first image and the second image are thoracic portion X-ray images and the specific structure is a blood vessel and a bronchus, and
wherein the emphasizing processing unit performs filtering processing which emphasizes a shadow radially spreading from a pulmonary hilum on the first image and the second image, and emphasizes the blood vessel and the bronchus by adding the image on which the filtering processing is performed and an original image or by performing emphasizing processing which emphasizes a high frequency component.

5. The medical image processing apparatus of claim 1, wherein, the positioning unit specifies corresponding positions of the first image and the second image by performing local matching processing on the first image and the second image with the specific structure emphasized, calculates a movement amount vector showing a shift, deforms the first image or the second image based on the movement amount vector, and matches the position of the specific structure in the first image and the second image.

6. The medical image processing apparatus of claim 4, wherein, the positioning unit specifies corresponding positions of the first image and the second image by performing local matching processing on the first image and the second image with the specific structure emphasized, calculates a movement amount vector showing a shift, deforms the first image or the second image based on the movement amount vector, and matches the position of the specific structure in the first image and the second image.

7. A non-transitory computer-readable storage medium having a program stored thereon for controlling a computer to function as:
an emphasizing processing unit which performs processing to emphasize a specific structure among structures composing a subject on each of a first image and a second image obtained by capturing the same subject at different points in time;
a positioning unit which matches a position of the specific structure in the first image and the second image based on the first image and the second image with the specific structure emphasized; and
a difference image generating unit which generates a difference image between the first image without emphasizing processing and the second image without emphasizing processing with the position of the specific structure matched,
wherein, the first image and the second image are thoracic portion X-ray images and the specific structure is a back rib bone, and
wherein the emphasizing processing unit performs filtering processing which emphasizes an edge of a vertical component on the first image and the second image, and emphasizes the back rib bone by adding an image on which the filtering processing is performed and an original image.

8. A non-transitory computer-readable storage medium having a program stored thereon for controlling a computer to function as:
an emphasizing processing unit which performs processing to emphasize a specific structure among structures composing a subject on each of a first image and a second image obtained by capturing the same subject at different points in time;
a positioning unit which matches a position of the specific structure in the first image and the second image based on the first image and the second image with the specific structure emphasized; and
a difference image generating unit which generates a difference image between the first image without emphasizing processing and the second image without emphasizing processing with the position of the specific structure matched,
wherein the first image and the second image are thoracic portion X-ray images and the specific structure is a blood vessel and a bronchus, and
wherein the emphasizing processing unit performs filtering processing which emphasizes a shadow radially spreading from a pulmonary hilum on the first image and the second image, and emphasizes the blood vessel and the bronchus by adding the image on which the filtering processing is performed and an original image or by performing emphasizing processing which emphasizes a high frequency component.

9. The medical image processing apparatus of claim 4, further comprising a display unit which displays the difference image.

10. The medical image processing apparatus of claim 9, wherein,
a plurality of different structures among the structures composing the subject are set as the specific structures and a plurality of difference images are generated by the emphasizing processing unit, the positioning unit and the difference image generating unit with the position of each of the plurality of specific structures matched,
the medical image processing apparatus further comprising a display control unit which controls the display unit so that display of the plurality of difference images with the position of each of the plurality of specific structures matched can be switched according to user operation.

* * * * *